United States Patent [19]
Stuart

[11] Patent Number: 6,086,077
[45] Date of Patent: Jul. 11, 2000

[54] STEER AXLE SUSPENSION WITH AIR SPRINGS

[75] Inventor: John W. Stuart, Fort Wayne, Ind.

[73] Assignee: Navistar International Transportation Corp., Chicago, Ill.

[21] Appl. No.: 09/132,061

[22] Filed: Aug. 10, 1998

[51] Int. Cl.[7] .............................. B06G 9/02; B06G 11/26
[52] U.S. Cl. ........................... 280/124.116; 280/124.157
[58] Field of Search ................. 280/124.116, 124.157, 280/124.162, 124.163, 124.128, 124.131, 124.132, 124.151

[56] References Cited

U.S. PATENT DOCUMENTS

| | | |
|---|---|---|
| Re. 33,630 | 7/1991 | Griffin . |
| 3,907,332 | 9/1975 | Richardson ............................ 280/285 |
| 4,379,572 | 4/1983 | Hedenberg ....................... 280/124.116 |
| 5,080,389 | 1/1992 | Kawano et al. ................. 280/124.151 |

*Primary Examiner*—Peter C. English
*Assistant Examiner*—Lynda Jasmin
*Attorney, Agent, or Firm*—Jeffrey P. Calfa; Dennis Kelly Sullivan

[57] ABSTRACT

A front air suspension system for a mobile vehicle such as a medium or heavy truck or school bus. The system has horizontally mounted shock absorbers engaged at a rear end to each of the frame rails of the chassis and at a forward end to a bell crank. The bell crank is pivotably engaged in its center to the frame rails and on its opposite side to an upper portion of a vertical link. The lower portion of the vertical link is engaged to a trailing beam. An air spring is engaged between each frame rail and the trailing beams. The bell crank transfers energy between the shock absorber and the air springs to dampen air spring induced movement of the chassis. The vertical link and bell crank combination provide lateral support for the sprung mass.

14 Claims, 1 Drawing Sheet

STEER AXLE SUSPENSION WITH AIR SPRINGS

SUMMARY OF THE INVENTION

This invention relates to a front air suspension system for a mobile vehicle such as a medium or heavy duty truck or a school bus. More specifically, the suspension system is comprised of a steer axle suspension with a horizontally mounted damper or shock absorber engaged to the trailing beam of the suspension through a bell crank and a vertical link. This construction integrates the functions of the vertical link and shock absorber while eliminating the need for a laterally supporting tracking bar or tracking arm.

BACKGROUND OF INVENTION

Air springs or air bags have been used in front or steer axle suspension systems in the prior art. The main advantage to air sprung suspensions is the lower spring rate of the air springs can provide a less harsh ride than conventional leaf spring front suspensions. One of the problems with air sprung suspensions is that the air springs in and of themselves do not provide any lateral support such as a conventional leaf spring suspension which is engaged to the chassis through shackles. To overcome this lack of lateral support, most manufacturers include a lateral control rod or a tracking bar or rod. The tracking bars are typically attached to a sprung component at one end such as the axle and to an unsprung component at the other end, such as a frame rail of the chassis. While the tracking bars provide lateral support, there are three drawbacks to their use in a vehicle. The tracking bars add extra weight to the chassis. The second drawback is that the tracking bar poses clearance problems with power train and driveline components on front engine vehicles. The third drawback is that the tracking arm will swing through an arc inducing some lateral displacement of the axle relative to the chassis. This third effect can cause the vehicle to exhibit yaw and other undesirable handling characteristics.

A proposed alternative to the tracking arms is the use of shackles at the rear portion of the trailing beam. The shackles would allow for vertical but not lateral movement of the trailing beam. The rear shackle for the trailing beam acts as a vertical link. A separate vertically mounted shock absorber installed between the chassis and a sprung component such as the trailing arm dampens the vertical movement allowed by the air spring. The drawbacks of this design are the mounting geometrics required for use of the separate vertically mounted shock absorber.

To date, a front or steer axle air suspension without the use of a tracking arm and without installation geometry drawbacks has not been proposed.

SUMMARY OF INVENTION

Accordingly, a primary object of this invention is to provide a front or steer axle suspension system with an air spring which does not require a tracking arm to provide lateral stability. A secondary object of the invention is to provide a front or steer axle suspension system with air spring without a separate vertically mounted shock absorber.

The primary and secondary objects of the invention are satisfied by a front air suspension system for a mobile vehicle with a horizontally mounted damper or shock absorber. The horizontally mounted shock absorbers are engaged at one end to each of the fame rails of the chassis. The shock absorbers are engaged to the rear portion of the trailing beam or arm of the suspension through a bell crank and a fixed length vertical link. The bell crank acts to transfer the horizontal energy dampening of the shock absorber to vertical energy dampening so as to control air spring induced movement. The bell crank to vertical link engagement at each frame rail of the vehicle provides lateral support to the suspension system without the use of a tracking arm. Additionally, the horizontal mounting of the shock absorber eliminates the mounting geometry drawbacks of a separate vertical shock absorber.

BRIEF DESCRIPTION OF DRAWINGS

While the invention is particularly pointed out and distinctly claimed in the concluding portions, two embodiments are set forth in the following detailed description which may be best understood when read in connection with the accompanying drawings, of which:

DETAILED DESCRIPTION OF THE INVENTION

Figure 1:
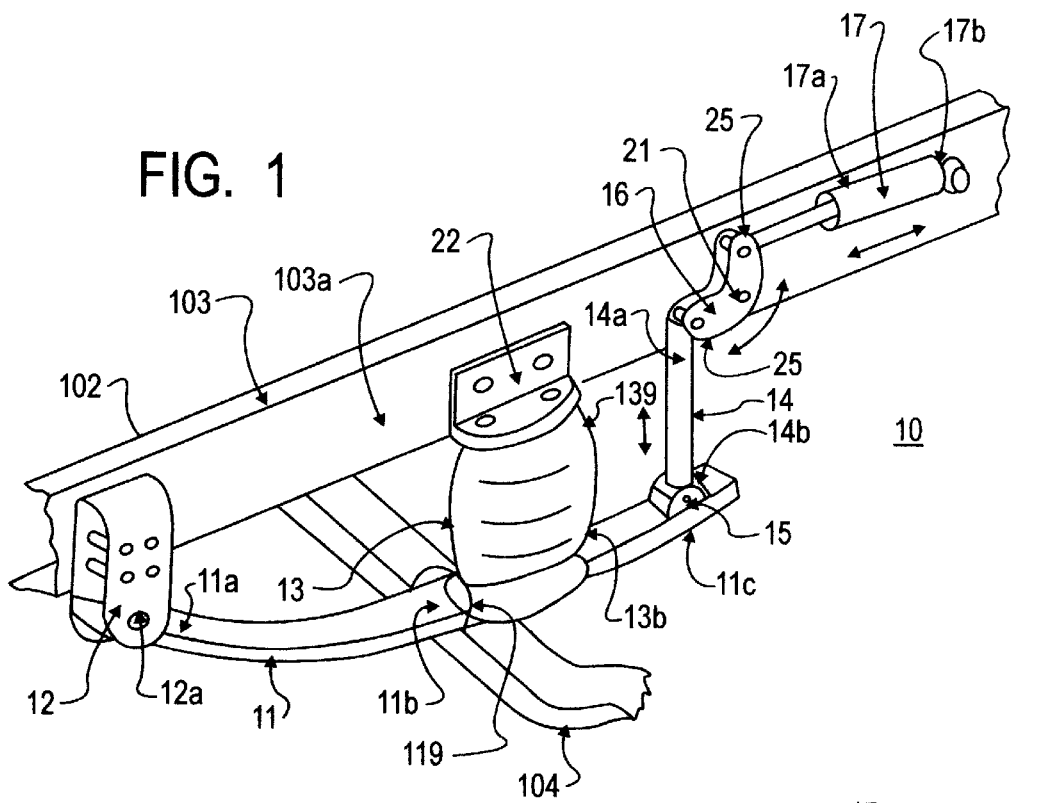
FIG. 1 is a partial perspective view of a left side portion of a front steer axle air suspension system made in accordance with this invention, the right side being a mirror image of the left.

There is shown in FIG. 1, a left side portion of a preferred embodiment of a front steer axle suspension system 10 with air springs 13. The suspension system 10 is engaged to a mobile vehicle 101 (not shown). The vehicle 101 has a chassis 102 with two frame rails 103. The frame rails 103 are connected to each other by cross members 105 (not shown). The vehicle 101 has a front steer axle 104 (partially shown) and a rear drive axle 106 (not shown). The front steer axle 104 is engaged to the chassis 102 through the suspension system 10 as will be more specifically described as follows.

For each frame rail 103, there is a trailing beam or trailing arm 11. Each trailing beam 11 has a front portion 11a, a middle portion 11b, and a rear portion 11c. The front portion 11a of each trailing beam 11 is pivotably connected to an outer face 103a of the respective frame rail 103 through a front hanger bracket 12. The front hanger bracket 12 may be upside down "U" shaped when viewed from the front with a pivot pin 12a through the forward spring eye portion of the trailing beam 11. The front hanger bracket 12 allows the trailing beam 11 to pivot about a bushing within 12a.

A rear bracket 15 is engaged to the rear portion 11c of each trailing beam 11. A vertical link 14 is pivotably engaged on a lower end 14b to the rear bracket 15. An upper end 14a of the vertical link 14 is pivotably engaged to a bell crank 16. The bell crank 16 is pivotably engaged to the outer face 103a of the respective frame rail 103. The bell crank 16 may be rearward of the front hanger bracket 12 relative to the length of the vehicle 101. In the preferred embodiment, the bell cranks 16 are generally "V" shaped with a center area 24 and two ends 25 when viewed from the side. The bell cranks 16 may also be straight, "C", "L", or other shapes which optimize allowable spring travel and shock absorber geometry. In this preferred embodiment, the bell cranks 16 are engaged to the frame rails 103 through bushings 21 which pass through the center areas 24 of the bell cranks 16 and the frame rails 103. The bell crank 16 to vertical link 14 engagement is at one end 25 of the "V" shaped bell cranks 16. A horizontal shock absorber or damper 17 is pivotably engaged at a rear end 17b to the outer faces 103a of each frame rail 103 rearward of the bell cranks 16. A forward end 17a of the shock absorber 17 is engaged to the bell crank 16 at an opposite location to the vertical link 14. In the embodiment where the bell crank 16 is "V" shaped, the bell crank 16 to shock absorber 17 engagement is at the second end 25 opposite to the vertical link 14 engagement. The shock absorbers 17 are resistive to both compression and extension to thereby control the airspring 13 induced movement of the chassis 102. The shock absorbers 17 can be oriented opposite of the figures shown to get desired compression and extension damping rates desired. The design intent is generally to have higher damping rates in jounce (axle travel away from chassis) and to have lower damping rates in rebound (axle travel toward chassis).

Figure 2:
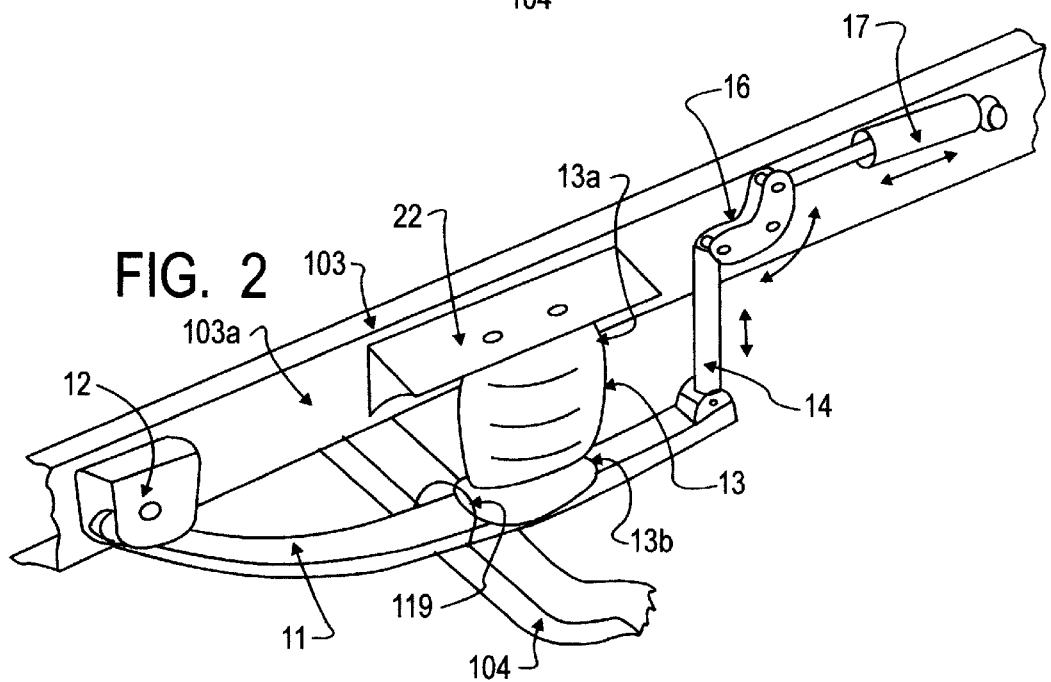
FIG. 2 is a partial perspective view of a left side portion of an alternative embodiment of a front steer axle air suspension system made in accordance with this invention, the right side being a mirror image of the left.

An air spring 13 is engaged at a lower end 13b to an upper face of the middle portion 11b of each trailing beam 11. The air springs 13 are provided air from an air system 107 (not shown) of the vehicle 101. An air spring mounting bracket 22 is engaged to each frame rail 103 between the front hanger bracket 12 and the bell crank 16. An upper end 13a of the air spring 13 is engaged to the air spring mounting bracket 22. In the preferred embodiment of the invention shown in FIG. 1, the air spring mounting brackets 22 are more specifically engaged to a lower face 103b of the respective frame rails 103 in addition to the outer face 103a with the air springs 13 being below the frame rails 103. In the alternative or low profile embodiment shown in FIG. 2, the air spring mounting brackets 22 are more specifically engaged to the outer face 103a of the respective frame rails 103 with the air springs 13 being outward of the frame rails 103 relative to the length of the vehicles. Finally, a lower face of the middle portions 11b of each of the trailing beams 11 is engaged to a side of the front steer axle 104. The engagement to the front steer axle may be accomplished by "U" bolts and brackets 119 (not shown) known in the prior art. The schemes shown in FIGS. 1 and 2 are for the left side of the respective embodiments of suspension systems 10 made in accordance with the invention. The right sides are mirror images.

The trailing beam 11 to vertical link 14 to bell crank 16 engagement provides lateral support for suspension systems 10 made in accordance with the invention such that tracking bars or tracking arms of the prior art are not necessary. The shock absorber or damper 17 actuation function is integrated into the lateral support components to delete the requirement for a separate damper. The suspension system 10 does not interfere with vehicle drive line components. The vertical link 14 and the bell crank 16 geometry allow for optimization of damper 17 travel and speed thus optimizing damping. Stated another way, damper 17 articulation is no longer constrained by the amount of axle 104 travel alone. The bell crank 16 allows for the horizontal orientation of the shock absorber or damper 17, which in turn allows the suspension system 10 to be more compact. This aspect is critical for a low profile configuration often used to acquire low step height in transit buses.

As defined above, the front steer axle suspension system 10 with air springs 13 and the vehicle 101 with the suspension system 10 installed of the present invention provides a number of advantages, some of which have been described above and others which are inherent in the invention. Further, modifications of the front steer axle suspension system 10 with air springs 13 and the vehicle 101 with the suspension system 10 installed may be proposed without departing from the teachings herein. Accordingly, the scope of the invention is only to be limited as necessitated by the accompanying claims.

I claim:

1. A front steer axle suspension system with air springs for a mobile vehicle with a chassis and a front steer axle, the chassis having two frame rails with cross members there between, comprising:
    (a) a trailing beam for each frame rail;
    (b) each said trailing beam having a front portion, a middle portion, and a rear portion;
    (c) said front portion of each said trailing beam pivotably connected to an outer face of the respective frame rail through a front hanger bracket;
    (d) a rear hanger bracket engaged to said rear portion of each said trailing beam;
    (e) a vertical link pivotably engaged on a lower end to said rear hanger bracket;
    (f) each said vertical link pivotably engaged on an upper end to a bell crank;
    (g) each said bell crank pivotably engaged to the outer face of the respective frame rail;
    (h) a horizontal shock absorber pivotably engaged at a first end to the outer face of each frame rail;
    (i) a second end of said shock absorber, opposite said first end, pivotably engaged to each said bell crank opposite said vertical link engagement;
    (j) an air spring engaged at a lower end to an upper face of said middle portion of each said trailing beam;
    (k) an air spring mounting bracket engaged to each frame rail between said front hanger bracket and said bell crank;
    (l) said air spring engaged at an upper end to said air spring mounting bracket; and
    (m) a lower face of said middle portion of each said trailing beam engaged to the front steer axle.

2. The front steer axle suspension system with air springs of claim 1, wherein said shock absorbers are resistive to both compression and expansion.

3. The front steer axle suspension system with air springs of claim 2, wherein:
    (a) said bell cranks are generally "V" shaped with a center and two ends when viewed from the side;
    (b) each said bell crank is engaged to the respective frame rail through a bushing through said center area of said "V" shape;
    (c) said bell crank to said shock absorber engagements are at one said end of said "V" shaped bell cranks; and
    (d) said bell crank to said vertical link engagements are at a second of said ends of said "V" shaped bell cranks.

4. The front steer axle suspension system with air springs of claim 3, wherein:
    (a) each said bell crank is engaged to each of the frame rails rearward of said front hanger bracket.

5. The front steer axle suspension system with air springs of claim 4, wherein:
    (a) said horizontal shock absorber is engaged to each of the frame rails rearward of said bell cranks.

6. The front steer axle suspension system with air springs of claim 2, wherein:
    (a) said air spring mounting brackets are more specifically engaged to a lower face of the respective frame rails with said air springs being below the respective frame rails.

7. The front steer axle suspension system with air springs of claim 2, wherein:

(a) said air spring mounting brackets are more specifically engaged to the outer face of the respective frame rails with said air springs being outward of the respective frame rails.

8. A mobile vehicle, comprising:

(a) a chassis with two frame rails with cross members there between;

(b) a trailing beam for each frame rail;

(c) each said trailing beam having a front portion, a middle portion, and a rear portion;

(d) said front portion of each said trailing beam pivotably connected to an outer face of said respective frame rail through a front hanger bracket;

(e) a rear hanger bracket engaged to said rear portion of each said trailing beam;

(f) a vertical link pivotably engaged on a lower end to said rear hanger bracket;

(g) said vertical link is pivotably engaged on an upper end to a bell crank;

(h) said bell crank pivotably engaged to said outer face of said respective frame rail rearward of said front hanger bracket;

(i) a horizontal shock absorber pivotably engaged at a rear end to said outer face of each frame rail rearward of said bell cranks;

(j) a forward end of said shock absorbers pivotably engaged to said bell crank opposite said vertical link engagement;

(k) an air spring engaged at a lower end to an upper face of said middle portion of each said trailing beam;

(l) an air spring mounting bracket engaged to each frame rail between said front hanger bracket and said bell crank;

(m) said air spring engaged at an upper end to said air spring mounting bracket; and (n) a lower face of said middle portion of each said trailing beam engaged to a front steer axle.

9. The vehicle of claim 8, wherein said shock absorbers are resistive to both compression and expansion.

10. The vehicle of claim 9, wherein.

(a) said bell cranks are generally "V" shaped with a center and two ends when viewed from said side;

(b) each said bell crank is engaged to said respective frame rail through a bushing through said center area of said "V" shape;

(c) said bell crank to said shock absorber engagements are at one said end of said "V" shaped bell cranks; and (d) said bell crank to said vertical link engagements are at a second of said ends of said "V" shaped bell cranks.

11. The vehicle of claim 10, wherein:

(a) each said bell crank is engaged to each of the frame rails rearward of said front hanger bracket.

12. The vehicle of claim 11, wherein:

(a) said horizontal shock absorber is engaged to each of the frame rails rearward of said bell cranks.

13. The vehicle of claim 9, wherein:

(a) said air spring mounting brackets are more specifically engaged to a lower face of said respective frame rails with said air springs being below said respective frame rails.

14. The vehicle of claim 9, wherein:

(a) said air spring mounting brackets are more specifically engaged to said outer face of said respective frame rails with said air springs being outward of said respective frame rails.

\* \* \* \* \*